United States Patent [19]

Numata

[11] Patent Number: 5,356,178
[45] Date of Patent: Oct. 18, 1994

[54] ENERGY ABSORBING STEERING WHEEL

[76] Inventor: Ryusaku Numata, P.O. Box 272, Patchoque, N.Y. 11712

[21] Appl. No.: 871,086
[22] Filed: Apr. 20, 1992
[51] Int. Cl.⁵ .............................................. B62D 1/11
[52] U.S. Cl. .................................... 280/777; 74/552; 188/377; 280/731
[58] Field of Search ...................... 280/750, 777, 731; 74/552, 557; 188/371, 377

[56] References Cited

U.S. PATENT DOCUMENTS

| | | |
|---|---|---|
| 1,142,307 | 6/1915 | Cleve . |
| 1,262,797 | 4/1918 | Beck . |
| 1,785,897 | 12/1930 | Geyer . |
| 1,807,657 | 6/1931 | Geyer . |
| 1,825,392 | 9/1931 | Geyer . |
| 1,843,676 | 2/1932 | Husted . |
| 1,876,693 | 9/1932 | Kraft . |
| 1,967,060 | 7/1934 | Mungen . |
| 2,182,413 | 12/1939 | Stolpe ................................... 74/552 |
| 2,203,791 | 6/1940 | Lange . |
| 2,269,492 | 1/1942 | Sorensen . |
| 2,425,240 | 8/1947 | George . |
| 2,459,797 | 1/1949 | Den . |
| 2,705,816 | 4/1955 | Sampson . |
| 2,818,749 | 1/1958 | Bayko . |
| 2,863,015 | 12/1958 | Ahrens . |
| 2,889,714 | 6/1959 | Romano . |
| 2,954,708 | 10/1960 | Huzzard . |
| 3,209,615 | 10/1965 | Fosnaugh et al. . |
| 3,563,112 | 2/1971 | Wilfert . |
| 3,576,139 | 4/1971 | Conterno . |
| 3,576,141 | 4/1971 | Brilmyer . |
| 3,583,255 | 6/1971 | Cureuru . |
| 3,726,152 | 4/1973 | Tsuneizumi . |
| 3,727,942 | 4/1973 | Arntson et al. ...................... 280/731 |
| 3,827,715 | 8/1974 | Lynch .................................. 280/731 |
| 3,948,118 | 4/1976 | Garbin . |
| 4,010,658 | 3/1977 | Muller et al. ........................ 74/552 |
| 4,010,659 | 3/1977 | Muller et al. . |
| 4,011,643 | 3/1977 | Muller et al. . |
| 4,011,644 | 3/1977 | Muller et al. . |
| 4,011,645 | 3/1977 | Muller . |
| 4,011,772 | 3/1977 | Muller . |
| 4,011,773 | 3/1977 | Muller et al. . |
| 4,061,054 | 12/1977 | Wenninger ............................ 74/552 |
| 4,111,457 | 9/1978 | Kob et al. . |
| 4,201,830 | 5/1980 | Wollen . |
| 4,313,249 | 2/1982 | Douthwaite . |
| 4,327,601 | 5/1982 | Vivian, Jr. . |
| 4,390,193 | 6/1983 | Strahan et al. ...................... 280/777 |
| 4,448,091 | 5/1984 | Bauer et al. . |
| 4,541,301 | 9/1985 | Ono et al. . |
| 4,598,002 | 7/1986 | Kimura . |
| 4,604,912 | 8/1986 | Sugita et al. . |
| 4,633,734 | 1/1987 | Yano et al. . |

(List continued on next page.)

FOREIGN PATENT DOCUMENTS

| | | |
|---|---|---|
| 1912528 | 2/1971 | Fed. Rep. of Germany . |
| 2251791 | 4/1974 | Fed. Rep. of Germany . |
| 0394710 | 10/1990 | Fed. Rep. of Germany . |
| 657576 | 5/1929 | France ................................. 74/552 |
| 2346195 | 10/1977 | France ................................. 74/552 |
| 887330 | 7/1981 | U.S.S.R. . |
| 86242442 | 8/1986 | United Kingdom . |
| 88011501 | of 1988 | United Kingdom . |
| 89086853 | 3/1989 | United Kingdom . |
| 90251725 | 10/1990 | United Kingdom . |

*Primary Examiner*—Eric Culbreth
*Attorney, Agent, or Firm*—Stephen E. Feldman

[57] ABSTRACT

An energy absorbing steering wheel for a motor vehicle includes a rim and a hub connected by a plurality of radial spokes, the combination of which forms a cage for influencing the path of expansion of an air bag, mounted in the steering wheel. The rim and spokes having integrated therein spring means which permit a change in orientation of the cage in response to pressure applied to the rim. Rupturable means are integrated into selected spokes which permit these spokes to break in response to a second pressure applied to the rim. This provides a steering wheel which will absorb energy applied to the rim and also change the path of expansion of an inflating air bag in response to the same applied energy.

12 Claims, 2 Drawing Sheets

U.S. PATENT DOCUMENTS

| | | |
|---|---|---|
| 4,662,238 | 5/1987 | Zeller . |
| 4,709,944 | 12/1987 | Hongo et al. . |
| 4,753,129 | 6/1988 | Ishida et al. . |
| 4,892,006 | 1/1990 | Endo et al. . |
| 4,920,821 | 5/1990 | Shinto et al. . |
| 4,938,500 | 7/1990 | Nakazato et al. . |
| 4,943,027 | 7/1990 | Nakayama . |
| 4,962,947 | 10/1990 | Nagata et al. . |
| 4,976,801 | 12/1990 | Martine et al. . |
| 4,989,897 | 2/1991 | Takada . |
| 5,040,646 | 8/1991 | Drefahl . |
| 5,062,663 | 11/1991 | Satoh . |
| 5,064,217 | 11/1991 | Shiraki . |
| 5,092,627 | 3/1992 | Igawa . |
| 5,097,720 | 3/1992 | Drefahl . |
| 5,141,247 | 8/1992 | Barth . |
| 5,244,230 | 9/1993 | Komiya et al. ............ 280/750 |

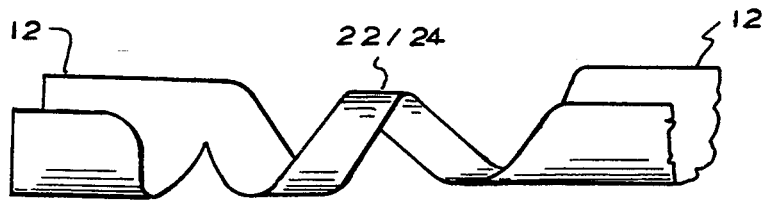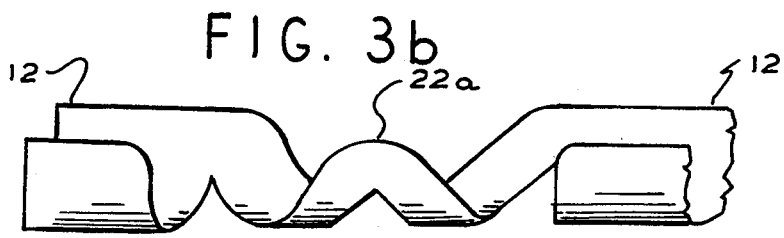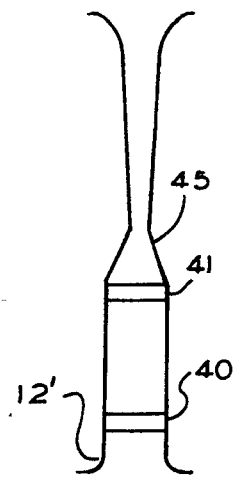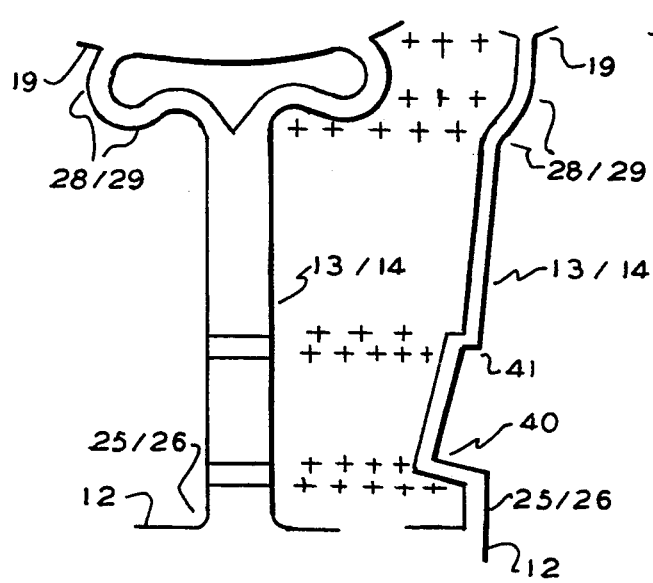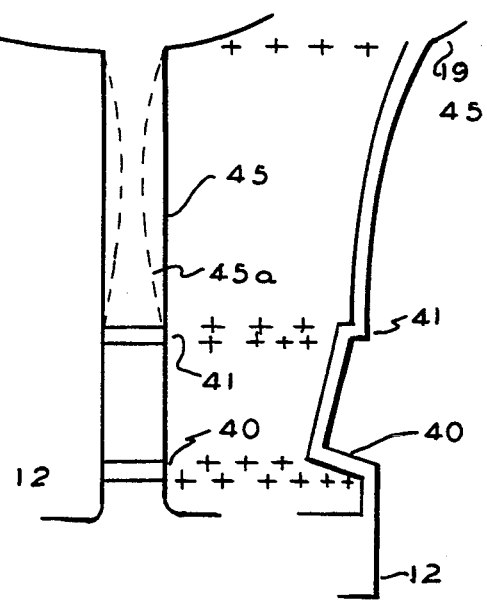

ENERGY ABSORBING STEERING WHEEL

BACKGROUND OF THE INVENTION

1. Field of the Invention

The present invention related to sterring wheels for motor vehicles, more particularly, but without limitation, to passenger motor vehicles.

2. Prior Art

In order to reduce personal injuries resulting from most types of automobile accidents, seat belts were installed in passage vehicles for individuals driving and riding in the vehicle. Although the use of individual seat or safety belts did help reduce personal injuries in most types of automobile accidents, the driver of the vehicle and the passenger in the front seat of the vehicle were often thrust forward and injured, particularly in head-on impact accidents, when the vehicle comes to a sudden stop. Injury was suffered because the seat belt, even though properly used, failed to accord the necessary body restraint to guard against striking or impacting with the steering or the dash board, due to the close proximity of the driver to the steering wheel and the close proximity of the passenger to the dash board, respectively.

This lead to the use of the inflatable air bag, one of which was located in the hub of the steering wheel to protect the driver and another of which was located in the dash board, in front of the front passenger, to protect the front seat passenger. An example of an air bag located in the hub of the steering wheel of a motor vehicle is shown and described by Muraoka et al in U.S. Pat. No. 4,938,503 and an example of an air bag located in the dash board of a vehicle, in front of the front seat passenger, is shown and described by Pack, Jr. in U.S. Pat. No. 4,895,389.

In the use of an inflatable air bag to protect the driver from injury due to contact with the steering wheel, several issues became apparent. One issue was, where to mount the air bag. This was resolved by mounting the air bag in the hub area of the steering wheel. It then became apparent that a race would occur between air bag inflation and driver impact with the steering wheel. In this respect, inflation of the air bag had to be sufficiently fast to generate at a partial inflation of the bag in order to intercept the person of the driver before the thrust of the sudden stop, caused by the impact, drove the person of the driver to make unwanted contact with the steering wheel. To over come this problem, inflation of the air bag was given a head start by actuating the inflation in response to the impact, which actually precedes the sudden stop caused by the impact. This time advantage was accompanied by extremely rapid inflation of the air bag and in most cases the air bag is sufficiently inflated to intercept the person of the driver and protect the driver from unwanted contact with the steering wheel. However, in some cases, for example, where the person of the driver is in extremely close proximity to the rim and/or the spokes and/or hub of the steering wheel and/or the person, particularly the head of the driver, is offset from the expected normal path of expansion by inflation of the air bag, the inflating bag is not always successful in protectively intercepting the person of the driver. In some cases, particularly where the person of the driver is offset from the path of expansion of the inflating air bag, the driver has suffered abrasion by failing to make a solid contact with the inflating bag. These problems are addressed and solved by the present invention.

It also became apparent that when the air bag is mounted on the hub of the steering wheel, the steering wheel, which is normally composed of a rim or armature, several radial spokes and a hub, forms a cage with which the air bag comes in contact during inflation and the position or orientation of the cage influences the path of the expansion of the inflating bag. The present invention addresses the problem of using the cage to more advantageously direct the path of expansion of the inflating air bag so as to more directly intercept the person of the driver before the driver makes unwanted contact with the steering wheel.

SUMMARY OF THE INVENTION

The present invention provides an energy aborting steering wheel which incorporates both selectively positioned flexible points in the steering wheel, which, upon receiving pressure, absorb the pressure by flexation causing a change in the attitude of the cage and selectively positioned structurally weakened points which, upon receiving impact, break away so that the flexation points in the steering wheel may readily absorb the impact received and also generate a change in the attitude of the steering wheel so that the cage influencing the expanding, inflatable air bag may be reoriented so as to direct the path of the expanding bag into a more favorable path of expansion.

Flexation and break-away action of the steering wheel in response to pressure and/or impact effectively selectively absorbs such pressure and/or impact by the portion of the wheel receiving such pressure and/or impact and isolates the absorption. Isolation of the absorption of the energy applied to the steering wheel leaves the remainder of the steering wheel in normal condition so that the steering wheel remains usable for the steering function.

In a preferred embodiment of the invention, a steering wheel includes a peripheral armature or rim which is used for gripping the steering wheel. A central hub is used to connect the steering wheel to a steering shaft, the central hub includes an area for supporting and retaining an inflatable air bag. The rim and hub are connected by four (4) spaced, radial spokes.

The steering wheel is preferably made of magnesium with the armature or rim fabricated from channel shaped stock. Spring elements are integrated into the armature and are offset 180 degrees of arc from each other and spaced between spokes of the steering wheel. Two radially aligned spokes have integrated therein structurally weakened or break points with solid or fixed connections to the armature and flexible connection's to the hub. Two other radially aligned spokes have integrated therein, flexation or spring points, which are located between the end connection to the armature and to the hub, on each spoke.

It will be appreciated that when practicing the invention, a curve or spiral configuration, in many modifications, may serve as a spring or flexation element. Each flexation point is made flexible by departing from the structural geometry of the stock used to make the component, in favor of a curve or spiral configuration integrated into the component such as the rim or the spoke. In the rim or armature, a spiral or modified spiral configuration, formed into the stock or material forming the armature, provides a flex or spring point in the armature between two radial spokes. The armature structure includes two flex points offset from each other 180 degrees of arc.

The flexation points in the two aligned radial spokes are made by departing from the flat, straight geometry of the spoke stock and integrating a connecting curve, either in flat or in round structure which couples two flat, straight sections connecting to the armature and the hub respectively. The two other aligned radial spokes are each connected to the hub with flexible connections of modified curve geometry. The body of these aligned radial spokes each has integrated therein a rupturable or weakened or break point or portion. Rupture points are fabricated in a member in the form of angle or angles, or, step or steps that are integrated into the normally flat or straight contour or geometry of the spoke by interrupting the flat, plane structure of the spoke and inserting a sharp step or angle in the spoke. Rupture points may also include narrowing or thinning the width and/or the thickness respectively, of the material used for the spoke.

The combination of spring elements and rupture elements or fracture elements selectively integrated into components of a steering wheel provides a highly flexible, energy absorbing steering wheel which has the capability of greatly reducing breakage of the wheel in response to pressure and/or impact and further has capability of being reoriented or repositioned in response to such pressure, so that the cage, formed by the steering wheel, may be reoriented and influence the path or direction of expansion of the air bag, during inflation, redirecting the path of inflation out of its normal path, in response to pressure and/or impact on the components of the steering wheel, The combination of angles of steps and curves or spirals integrated into a normally solid structured steering wheel provides a less rigid, energy absorbing steering wheel which is less liable to cause injury to a driver when the person of the driver applies an unwanted pressure or impact on the steering wheel in a head-on collision.

BRIEF DESCRIPTION OF THE DRAWINGS

FIG. 2b is a representation, in cross-section, of an alternate structure of the representation in FIG. 2a;

FIG. 3a is a representation of a preferred embodiment of spring element integrated into a rim;

FIG. 3b is a representation of an alternate structure of rim spring element;

FIGS. 4a and 5a are representations, in plan view, of a radial spoke with rupture elements and spring elements;

FIGS. 4b and 5b are representations, in side elevation view, of FIGS. 4a and 5a, respectively and;

FIG. 5c is a representation, in plan view, of an alternate structure of a radial spoke with rupture elements and spring elements.

DESCRIPTION OF THE INVENTION

Figure 1:
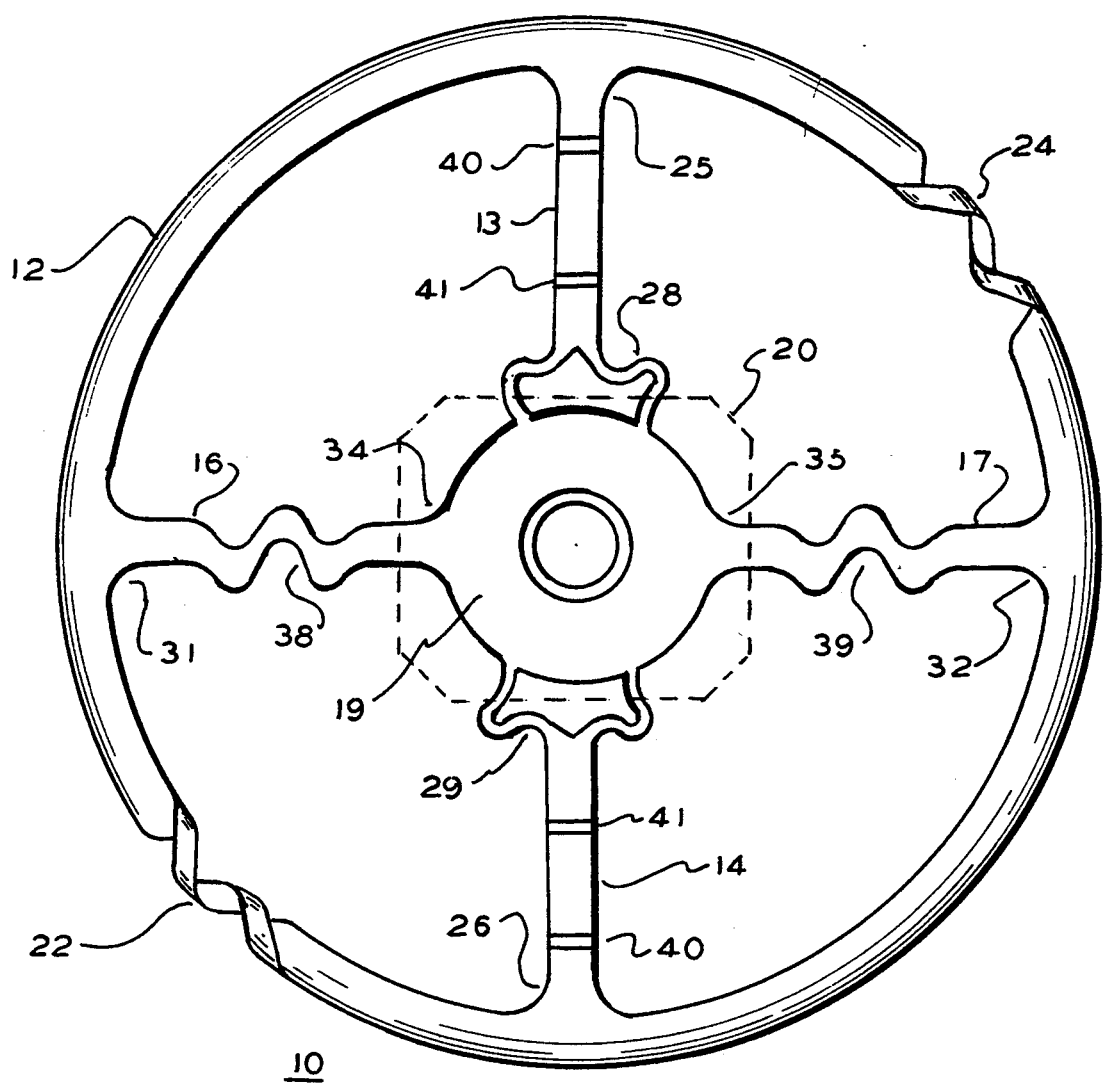
FIG. 1 is a representation of a steering wheel with rupture points and spring points integrated into the structure of the wheel in accordance with the invention.

Referring to FIG. 1, a representation of steering wheel 10, is illustrated, in top plan view, showing the invention with spring elements integrated into the armature or rim, 12 and into each of the radial spokes 13, 14, 16 and 17. Each radial spoke is connected, at one end to the armature and, at the other end to the hub 19.

Represented in broken line form, is an inflatable air bag 20. The air bag may be mounted on the hub of the steering wheel. U.S. Pat. No. 4,938,503 teaches one way that the mounting of an air bag on the hub of a steering wheel may be accomplished.

In accordance with the invention the armature 12 is fitted with spring or flexation points or curved geometry sections 22 and 24, which are essentially offset from each other 180 degrees of arc.

The aligned radial spokes 13 and 14 are each solidly connected to the rim 12 at 25 and 26, respectively and are spring coupled to the hub at 28 and 29 respectively. Between the connections to the armature and hub each radial spoke 13 and 14 is fitted with one or more rupturable element, examples of which are clearly illustrated in FIGS. 4a and 4b.

The radial spokes 16 and 17 are each solidly or fixedly coupled to the armature at 31 and 32 respectively and to the hub at 34 and 35 respectively. In between the armature and hub connections, each radial spoke has integrated therein a spring or flexation element 38 and 39, respectively.

Figure 2A:
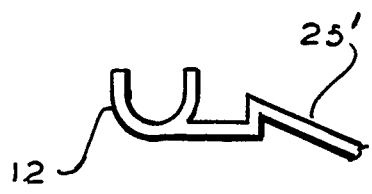
FIG. 2a is a representation, in cross-section, of a connection between the armature and a radial spoke.
Figure 2B:
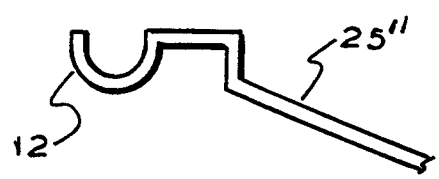

The solid coupling or connections between the armature and a radial spoke may be at the bottom of the armature, as shown in FIG. 2a where the spoke 18 is connected to the bottom of the channel structure of the stock from which the armature is fabricated, or coupling may be made at the top of the channel structure of the stock, as shown in FIG. 2b, where the spoke 18a is connected to the top of the armature. Connection may also be made at the center of the channel wall, if desired.

Preferably, the steering wheel is fabricated out of metal, for example, magnesium or an alloy thereof, because such metal is light in weight and has desirable ductile characteristics. The geometry or shape of the rim is circular and the geometry of the stock from which the rim is fabricated is, preferably, a channel or U shape which characteristically provides strength with reduced mass.

The spring means or flexible elements 22 and 24 in the armature may be in the form of a coil, such as represented in FIG. 3a, fabricated between the channel shaped sections of the armature. FIG. 3b represents an alternate structure of spring element, a modified spiral or coil geometry that may be used, if desired. Where the coil spring 22/24 of FIG. 3a extends 360 degrees per section of coil, the modified coil spring 22a of FIG. 3b extends 180 degrees per section of coil.

Regarding the aligned radial spokes 13 and 14 in FIG. 1 and the top plan and side views of the spokes in FIGS. 4a and 4b, the spoke is connected to the armature of the wheel by a solid or fixed connection 25/26 and to the hub of the wheel by a spring or flexible connection 28/29. Between the fixed connection 25/26 and the spring connections 28/29 are rupture elements or points represented as the steps or angles 40 and 41.

While the spring or flexible point or elements permit a limited bending or limited flexation in the elements of the steering wheel under pressure and/or impact, or a first predetermined pressure applied to the rim 12, the rupture point or elements or break point or points permit complete severance of selected parts of the structure in response to a more intense pressure and/or impact or second predetermined pressure applied to the rim 12. By combining the two characteristics, that is, the limited bending or limited flexation and the rupture or severance characteristics, the steering wheel, when placed under pressure and/or impact, will first bend or flex before rupturing thus providing a two stage, variable pressure and/or impact absorbing steering wheel which has both spring and/or flexation characteristics and fraction or rupture characteristics.

FIGS. 5a and 5b represent an alternate spring or flexation geometry that may be used on a radial spoke. The rupture or break points 40 and 41 correspond structurally with the rupture or break point similarly numbered in FIGS. 4a and 4b. However the geometry of the spring or flexation elements shown at 45 in FIGS. 5a and 5b show that the section of spoke may be curved and/or thinned so as to provide the flexation or spring effect desired. In addition the width of the spoke may be reduced, as represented by the broken line 45a.

A steering wheel, which retains or supports an inflatable air bag in its hub serves as a cage for the air bag during inflation expansion. The cage, formed by the hub, spokes and rim of the steering wheel, has the capability of directing or influencing the path of expansion of the air bag, during inflation thereby changing said predetermined path of expansion of said inflating bag during inflation. A steering wheel, which is constructed in accordance with the invention, has a greater potential for changing the direction of the path of expansion of an air bag, during inflation, because the orientation of the cage is subject to change by pressure or impact applied to the steering wheel, as above described.

There has been shown and described an energy absorbing steering wheel into which is integrated rupturable elements and flexible elements, each of which coordinate with the other in providing a safer steering wheel, in terms of driver safety, particularly where head-on impacts are concerned. A preferred embodiment of rupture sections and of spring sections has been illustrated and described along with some alternate structures and geometry. Other changes and modification may be made as will become apparent to those skilled in the art without departing from the invention.

What is claimed is:

1. An energy absorbing steering wheel comprising:
   (a) an armature means of substantially circular configuration defining a rim of a steering wheel;
   (b) a hub means, positioned inside the circular configuration of said armature means;
   (c) a plurality of radial spokes, each spoke of said plurality of spokes having a first end and a second end and a length between said first end and said second end, said first end connected to said armature means and said second end connected to said hub means;
   (d) a first spoke of said plurality of radial spokes connected to said hub means at said second end by a flexible connection means, said length of said first spoke characterized by a rupture means integrated into said first spoke for breaking said first spoke in response to a second predetermined energy applied to said rim, and,
   (e) a first spring means and a second spring means integrated into and forming a part of said rim and positioned substantially 180 degrees of arc from each other, each of said first and second spring means extending only between adjacent individual radial spokes of said plurality of radial spokes, said first spring means and said flexible connection means combining, in response to a first predetermined energy applied to said rim, for delaying breakage of said rupture means until application of said second predetermined energy applied to said rim.

2. An energy absorbing steering wheel as in claim 1, wherein said flexible connection means being substantially in the same plane as the first spoke.

3. An energy absorbing steering wheel as in claim 1, wherein each of said first spring means and said second spring means extends less than about ninety degrees on an arc on said rim.

4. An energy absorbing steering wheel for influencing the path of expansion of an inflatable air bag during inflation thereof, said inflatable air bag mounted on said energy absorbing steering wheel, said steering wheel comprising:
   a) a circular armature defining a rim of a steering wheel;
   b) a hub means centrally located radially from said rim;
   c) a plurality of radial spokes each spoke of said plurality of spokes connected to said rim at a first end thereof and connected to said hub means at a second end thereof said rim and said hub means and said plurality of radial spokes combining to define a cage for an inflatable air bag mounted within said cage, said cage for influencing the path of expansion of said inflatable air bag during inflation thereof;
   d) a first spring means integrated into said rim for changing the geometry of said circular armature for reorienting said cage in response to a first predetermined pressure applied to said rim;
   e) a second spring means integrated into a first radial spoke of said plurality of radial spokes for cooperating with said rim in response to a change in the geometry of said circular armature for reorienting said cage; and
   f) a rupturable means integrated into a second radial spoke of said plurality of radial spokes for breaking said second spoke between said rim and said hub means upon application of a second predetermined pressure to said rim for permitting a further change in the geometry of said circular armature and a further reorientation of said cage.

5. An energy absorbing steering wheel as in claim 4 and in which said first spring means is in spiral configuration.

6. An energy absorbing steering wheel as in claim 4 and in which said second spring means is in curve configuration.

7. An energy absorbing steering wheel as in claim 4 and in which said first spring means is in spiral configuration and said second spring means is a flat spring.

8. An energy absorbing steering wheel as in claim 4 and in which said first radial spoke and said second radial spoke are in alignment with each other and in different radii.

9. An energy absorbing steering wheel as in claim 4 and in which said first radial spoke and said second radial spoke are offset from each other substantially less than 180 degrees of arc.

10. An energy absorbing steering wheel as in claim 4 and in which said second spring means integrated into said first radial spoke is positioned between said first end and said second end of said first radial spoke.

11. An energy absorbing steering wheel as in claim 4 and in which said second spring means integrated into said first radial spoke is integrated into a connection between said first radial spoke and said hub means.

12. An energy absorbing steering wheel as in claim 11 and further including a second rupturable means integrated into said first radial spoke and positioned between said connection between said first radial spoke and said hub means and a second connection between said first radial spoke and said rim.

* * * * *